United States Patent Office 2,705,211
Patented Mar. 29, 1955

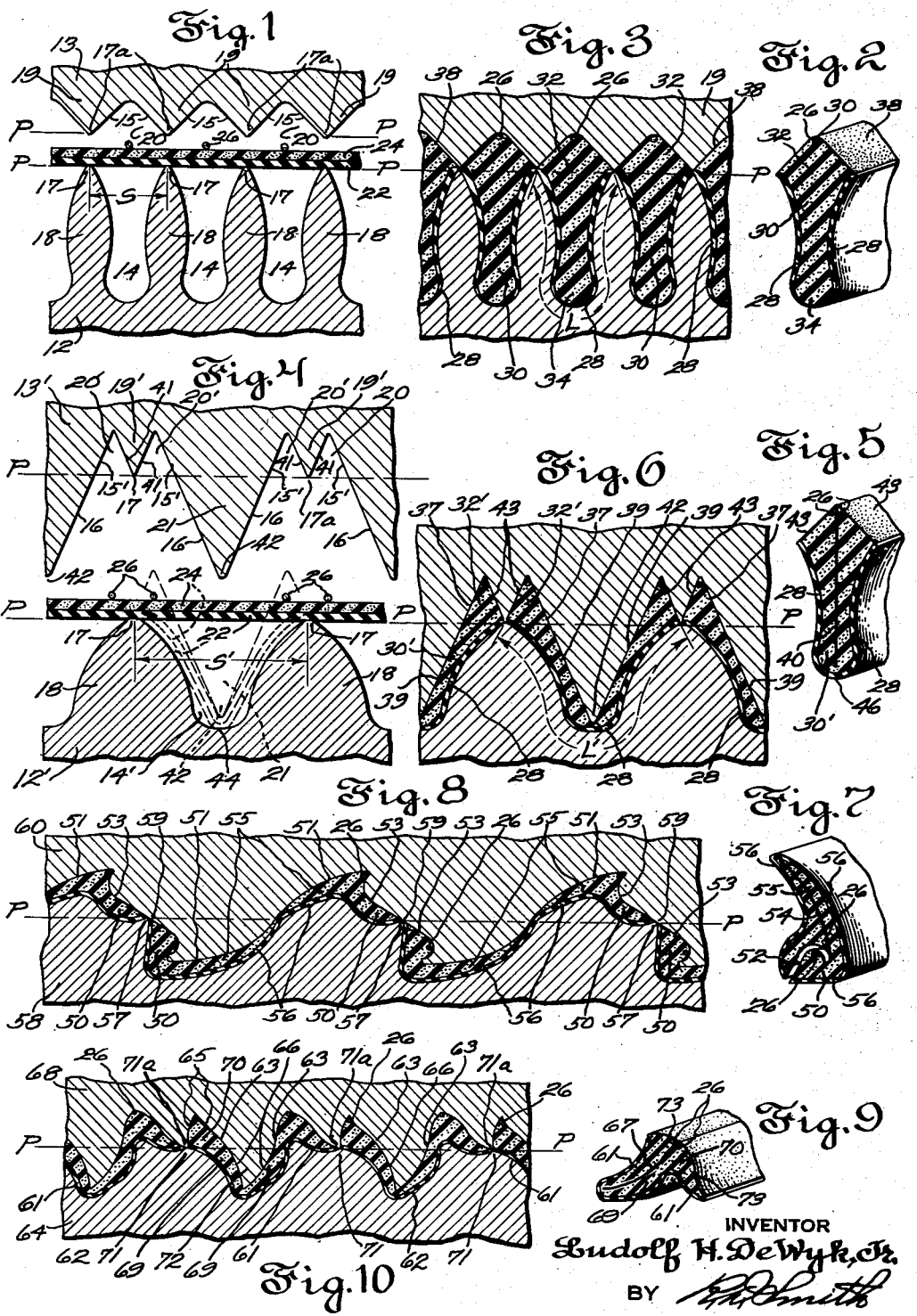

2,705,211

METHOD OF MAKING SKIN COVERED RUBBER WEATHERSTRIP

Ludolf H. De Wyk, Jr., Derby, Conn., assignor, by mesne assignments, to The B. F. Goodrich Company, Akron, Ohio, a corporation of New York Application December 16, 1950, Serial No. 201,191

7 Claims. (Cl. 154—110)

This invention relates to resilient strips of porous materials such as closure sealing weatherstrips of sponge rubber and to method and molds for producing them with dependable uniformity at a low production cost, particularly where such strips comprise mainly a body of sponge rubber having at least part of its external contour surfaced with a thin skin of water-impervious solid rubber, bonded thereto by the same vulcanizing heat that causes the sponge rubber compound to "blow" and cure.

United States Patent No. 2,319,042, granted May 11, 1943, on an application of L. H. De Wyk, Jr., makes clear some of the difficulties confronting uniform and economical molding and curing of a body of blowable sponge rubber compound in conjunction with a thin web or covering skin of non-blowable rubber stock particularly where the thin web of skin is designed to be forced into a relatively narrow and relatively deep groove or mold cavity by pressure of the expanding sponge rubber compound during its blowing stage and before the soft thin skin stock becomes hardened by vulcanization. The ultimate product is desired to be a composite vulcanized strip whose shape includes a high narrow fin continuous along its length sheathed by an unbroken very thin solid rubber facing of preferably uniform strength and thickness.

Strips of this kind are well adapted to use as closure seals to cushion the closing of an automobile door, trunk compartment lid, or similar closure against its framework and extend all around the perimeter of the closure. Strips having a limber fin of the shape referred to produce what is sometimes called a cantilever type of seal wherein the fin of the strip bends bodily and resiliently into tensioned contact with the edge or margin of the door. This not only permits a soft door closing action but insures an efficient seal about whatever irregularities may be present along the junction of the door edge and the framework.

The base portion of the strip which is to be anchored to the framework is sometimes left free of the solid rubber skin so that an adhesive can better penetrate its surface and produce a firmer holding bond of the strip to the framework. In more recent practice instead of, or additionally to, bonding the strip to the framework by an adhesive, the base of the strip is sometimes mechanically anchored on the framework by being sprung into engagement with tangs which project from the framework into a narrow and usually curved anchorage channel contained in the molded shape of the weatherstrip. The advantages arising from the present invention apply to weatherstrips utilizing either or both of these mounting expedients.

An important object of the invention is to avoid first having to preshape sponge rubber compound into a strip having a special profile shape approximating its ultimate molded and vulcanized shape, whereby the necessity of subjecting the sponge rubber compound to preliminary preshaping by a rolling or extruding operation is done away with. According to this invention the uncured sponge rubber compound can be introduced into a mold in the form of a thin plain sheet lying in face-to-face contact with a thin web of unvulcanized non-blowing rubber stock employed to form the water impervious skin.

Another object is to produce a resilient weatherstrip from the above said combination of raw sheet or web materials in a shape that will provide a fin of relatively high and relatively narrow proportions by the use of molds whose molding cavities extend considerably wider in proportion to their depth than is the width of the fin in proportion to the height of the fin in the ultimate vulcanized product. This effectively reduces the amount of stretching which the uncured rubber skin stock must undergo in being forced by the expansion of the sponge rubber compound into mold cavities that are narrow and deep.

A further object is to produce a weatherstrip of the above described characteristics in which the sponge rubber body of the fin contains a split extending through most of its height dividing the sponge rubber body into foldable component portions that are mold produced in end-to-end angularly diverging relationship conjoined at one end of the split, the solid rubber skin extending all about the tip or crest of the fin and serving as a flexible hinge permitting the divergingly related, mold-produced portions of the weatherstrip to be folded and bonded together by a suitable cement after they are removed from the mold, thereby to produce the ultimate shape of the finished weatherstrip.

These and other objects of the invention will become more fully apparent from the following description of a successful way of practicing the invention in which description reference is had to the accompanying sheet of drawings, wherein:

Fig. 1 illustrates prior art practice and shows a typical profile shape of slightly separated cavitated sections of a mold with unvulcanized material placed between the sections preliminary to producing the weatherstrip of Fig. 2.

Fig. 2 is a cross-sectional perspective view of a weatherstrip intended to be produced in the mold of Fig. 1.

Fig. 3 shows the raw materials of Fig. 1 expanded and stretched to fill the cavities in a closed mold and cured.

Fig. 4 corresponds to Fig. 1 and shows an improved shape of the mold cavities for practicing the present invention and producing the weatherstrip of Fig. 5.

Fig. 5 is a cross-sectional perspective view of a modified construction of weatherstrip produced in the mold of Fig. 4 having the same external shape as the weatherstrip in Fig. 2 but produced by practice of the present invention.

Fig. 6 shows the uncured material of Fig. 5 expanded to fill the cavities of the mold of Fig. 4 when the mold is closed and heated.

Fig. 7 is a cross-sectional perspective view of a weatherstrip having a different profile shape produced according to the invention.

Fig. 8 shows the molding of spread-apart component portions of the weatherstrip of Fig. 7.

Fig. 9 is a cross-sectional perspective view of a weatherstrip having a still different profile shape produced according to the invention.

Fig. 10 shows the molding of spread-apart component portions of the weatherstrip of Fig. 9.

In Figs. 1, 2 and 3, for convenience of reference, the mold section 12 will be referred to as containing cavities 14 and the cap mold section 13 will be referred to as presenting hollowed cap faces 15 which confront cavities 14 respectively. Cavities 14 and cap faces 15, which latter form the hollows 20, are separated by landings 17 and 17a on the bed section and cap sections, respectively, of the mold. The hollows 20 in cap sections 13 are on the opposite side of plane P—P from mold cavities 14, or in outboard relation thereto. In a mold for simultaneously producing a large number of lengths of weatherstrip, there will be a wide gang of side-by-side cavities such as 14 in the nature of elongate grooves separated by the landings 17 which also extend lengthwise of the mold as continuous tips or crests of ridges 18. Corresponding elongate ridges 19 of the cap mold section 13 have the tips or crests 17a which form landings that meet the landings 17, respectively, in a common plane P—P when the mold sections are closed together as shown in Fig. 3. In the structure of each mold section this plane P—P is herein termed the plane of landing. Therefore, two such planes are designated P—P in Fig. 1 because the mold sections are shown in this figure as somewhat open or separated to admit therebetween certain raw material that is to be processed in the mold.

In Fig. 1 the raw material consists of a thin continuous web of unvulcanized solid rubber stock 22 resting atop and extending straight across the ridge crests 17 spanning the horizontal distance S therebetween. Upon the web 22 in face-to-face contact therewithin is a thin sheet of uncured sponge rubber compound 24. Upon the latter there rest reinforcing cords 26 which may be laterally spaced lengths of stout twine running parallel with ridges 19.

To illustrate certain production troubles encountered in the prior practice of producing a weatherstrip such as shown in Fig. 2 by use of the illustrated sheet-like raw material of the kind pictured in Fig. 1, it appears in Fig. 3 that after the mold sections 12 and 13 have been closed together so that the landings 17, 17a meet on the plane P—P to make a severing pinch on the uncured sheet of sponge rubber compound 24 and web 22 of unvulcanized solid rubber stock, the sponge rubber compound in its process of "blowing" or swelling responsive to heat of the mold must force the relatively short span S of soft skin-forming stock 22 downward to the full depth of each cavity 14. In doing this the short and easily ruptured span S of web 22 must be stretched to more than four times its original length, or to the distance designated L in Fig. 3, in order that the cured skin 28 of the vulcanized weatherstrip shall completely cover the sponge rubber body forming the high and narrow fin 30 of the weatherstrip.

This in many shapes of cross section, including that shown in Fig. 3, may amount to more stretch than the heat-softened, skin-forming sheet stock can stand without rupture. At the best, it results in an undesirable thinness of the vulcanized skin in its most stretched portion at the bottom tip of the fin 30 and an undesirable relative thickness of the skin at the narrowest part of the fin shape which disadvantageously reduces the flexibility of the weatherstrip thereat. It is highly preferable that the skin in the finished product be of uniform thickness throughout.

Fin 30 projects from the mounting base portion 32 of the weatherstrip whose external surface preferably is left free of skin 28 thereby to present a more porous surface to which an adhesive may cling for cementing the weatherstrip to its means of support such as the edge of an automobile doorway or the framework of an automobile trunk compartment. Incidentally it will be seen that the reinforcing cord 26 becomes embedded in the sponge rubber near the tip 34 of the mounting base 32 during the process of expansion and vulcanization of the sponge rubber compound.

The problem which this invention solves has to do with the poor and uncertain behavior of the soft easily ruptured uncured rubber web 22 when it is forced into a relatively deep and narrow mold cavity such as 14. Particularly is there trouble and rupture or excessive thinning of the skin if, as in Figs. 2 and 3, the fin 30 is reduced to a minimum thickness in a median waist section for making the fin more limber in this region. What happens at this narrowed waist or neck section is a more intense heating of the blowing sponge rubber compound at this point because of the greater mutual proximity of the heat delivering walls that form the mold cavity. Thus before enough of the flowable compound has expanded downward past this narrow section to fill the broader tip end of the fin, congestion is caused in that section by the sponge rubber compound taking a partial set. This greatly reduces the freedom of further expanding compound to pass the narrow point and as a consequence the bottom end of the mold cavity may never become fully filled. Even if the extreme bottom of the mold cavity becomes filled, the skin stock tends to thin out undesirably at the tip 34 of the high and relatively narrow fin 30. This is a region of the finished weatherstrip which in service is usually subjected to the most rubbing and wear when used as a closure seal. On many occasions the soft skin stock 22 here will tear apart during the molding operation and lay bare the inside body of sponge rubber. This may occur here or at other uncontrolled and unpredictable spots on the external surface of the fin.

The present invention provides complete relief from the aforesaid troubles in that it enables the web 22 in Fig. 4 to be stretched from an original increased cavity spanning length S' in Fig. 4 to no greater extent than about a 50 per cent increase in such original length, namely to the distance designated L' in Fig. 5, in order to conform to and completely line the surfaces of cavity 14' in mold section 12' with uniform thickness. The side walls of cavity 14' converge and meet at a channel bottom of the cavity which to advantage may be less than half as broad as the width S' of the entrance mouth of the cavity. The cavity preferably shall be no deeper than said width of its entrance mouth. In other words this dividing of a whole cavity 14 into branching and inclined component cavity spaces 14' greatly reduces the extent of stretch to which the thin soft web 22 of uncured vulcanizable rubber skin stock is subjected when forced by the expansion of mold confined sponge rubber compound 24 into a long narrow mold cavity to produce a sponge rubber body having a high narrow fin sheathed by solid rubber skin.

In Fig. 4 the planes of landing are designated P—P and the landings 17, 17a meet as before to pinch and sever the sheet and web of raw materials and to determine the relation of the molding faces 15' and 16 of the cap mold section 13' to the cavities 14' in mold section 12' when the mold sections are fully closed as shown in Fig. 6 whereby the sheet and web are imprisoned in spaces 14' and 20'. In Figs. 4 and 6 it will be observed that the end-to-end continuous molding faces 15' and 16 presented by cap section 13' and overlying the cavity 14' form, respectively, a hollow 20' in outboard relation to and registering with the mouth of cavity 14' and a projection 21 at least in part occupying cavity 14'. Projection 21 which is in the nature of a mold core mechanically pokes the sheet 24 and web 22 downward to broken-line position in Fig. 4 when the cold mold sections are first closed. Each of these molding faces 15' and 16 is flat although they might be otherwise shaped so long as they match each other in a manner to cause the bare sponge rubber faces 37—39, 37—39 to fit together and delineate a closable split 40 in the weatherstrip of Fig. 5. The latter is thus made to comprise an integral composite article molded in component angularly diverging end-to-end conjoined sectional portions. When removed from the mold, these component portions can be folded together by flexing the skin 28 at the tip 46 of the split fin 30' so that the bare mutually fitting sponge rubber faces 37 and 39 formed respectively by molding faces 15' and 16 meet and come into mating abutment throughout the split 40. This forms a weatherstrip of the same profile shape as in Fig. 2, the split 40 extending throughout the length of the weatherstrip but only partially through the height of fin 30'. The matching sponge rubber faces 37 and 39 will be bonded together in any suitable way as by an adhesive such as rubber cement. The molding faces 41 of cap section 13' produce bare sponge rubber faces 43 which remain exposed to comprise the mounting surface 38 of the weatherstrip in Fig. 2. Incidentally, Figs. 4 to 6, inclusive, show reinforcing cords such as 26 embedded in the sponge rubber in much the same manner as in the weatherstrip of Fig. 2.

In Figs. 4 to 6, it is seen that the junction of the cap molding faces 16, 16 occurs at a point 42 which reaches so nearly to the bottom 44 of cavity 14' that little if any more of the thickness of the weatherstrip remains at its hinge point 46 than the solid rubber skin 28 alone. After molding just as in Figs. 1, 2 and 3, the individual weatherstrips of Fig. 4 will be pulled apart along their landing-pinched separating lines in case any flash forming particles of the expanding rubber have escaped past the meeting point of the landings 17 and 17a of the mold sections.

In Figs. 7 and 8 the idea of molding weatherstrip in angularly spread-apart portions, later to be folded together to form a bonded slit in a relatively high and narrow fin portion of the weatherstrip, is carried forward and applied to the production of a currently popular form of weatherstrip shown in Fig. 7 wherein the base portion 50 of the weatherstrip is provided with a narrow curved blind-ended mounting channel 52 with whose blind end the curved split 54 communicates. As in Fig. 5 the split 54 extends only to the solid rubber skin 56 and leaves the latter continuous and intact covering in this case all, rather than only a part of, the external surface of the sponge rubber body of the weatherstrip. Channel 52, in its hooked profile shape shown in Fig. 7, extends continuously throughout the length of the sponge rubber body of the weatherstrip as does the split 54 in the high narrow curved fin 55 whose shape tapers from the mounting base 50 of the strip to the bluntly pointed freely flexing tip of the fin 55. Mechanical anchorage of the weatherstrip to its means of support as proposed in U. S. Patent No. 2,100,406 is provided by the mounting channel 52 and makes it unnecessary to leave any outside surface of the sponge rubber body bare for secure hold of an adhesive thereto. The surfaces 51, 53 which are of bare sponge rubber are confined to the split 54 and to the channel 52, respectively.

In Fig. 8 the landings 57, 59 of the mold sections 58, 60, respectively, meet on the plane P—P and pinch part the separate weatherstrips to facilitate separating them when the mold is opened. The embedded reinforcing cords are evident at 26.

Now in Figure 10 there are shown suitable cooperative shapes and dispositions of mold cavities 62 in bed section 64 of the mold and of the conjoined molding surfaces 65 and 66 of cap section 68 of the mold to produce a weatherstrip having the finished shape shown in Fig. 9. When folded into abutting contact and cemented permanently together the molded bare sponge rubber surfaces 63 delineate the curved split 67 which extends from near the tip of fin 69 centrally and continuously through the fin and through the base section 70 of the weatherstrip. Remaining extents 73 of the bare sponge rubber surfaces are exposed as external faces to be cemented to a means of support. In Fig. 10 the landings 71 and 71a of mold sections 64 and 68, respectively, meet in the plane P—P and pinch and sever the rubber materials for determining the line of separation of the weatherstrips when removed from the mold. Split 67 leaves at least the full thickness of skin 61 continuous and intact about the tip of fin 69. The embedded reinforcing cords 26 are shown suitably placed. The molding surfaces 65 form hollows in the cap section of the mold registering with cavities 62 while the molding surfaces 66 form a projection 72 from the cap section of the mold occupying each cavity 62. In both of Figs. 8 and 10 the bed section of the mold possesses humps extending above the plane P—P as well as the cavities 62 occurring therebelow.

Having described typical and advantageous shapes of mold cavities, fin equipped skin sheathed weatherstrip and methods whereby the former are enabled to produce the latter, I intend the following claims to be directed to and cover all variations thereof and substitutes therefor coming within the substance of the invention as defined by a broad interpretation of the language of the following claims.

I claim:

1. A method of minimizing skin stretch in the molding and vulcanizing of a sheet of sponge rubber compound simultaneously with a sheet of uncured vulcanizable solid rubber skin stock to form integrated component parts of an ultimate relatively long and narrow all-rubber article, which comprises the steps of, placing a sheet of sponge rubber compound in face to face contact with a sheet of vulcanizable solid rubber skin stock in spanning relation to the entrance mouth of an underlying mold cavity considerably wider than the ultimate article to be produced and whose side walls converge and meet at a channel bottom of said cavity having a contour proportioning said cavity to be substantially no deeper than the width of said entrance mouth, mechanically poking said cavity spanning sheets in unison toward said channel bottom in a manner to loop said sheets in unison into neighboring relation to said side walls of the mold cavity with the aid of a protruding mold core sufficiently smaller than said cavity to enable the sides of said core to cooperate with said side walls to define end-to-end communicating spaces branching apart from said channel bottom toward said mouth of the cavity, each of said spaces being equal in shape and size to sectional portions of the width of said ultimate article, imprisoning said sheets in said spaces, heating said sheets in said spaces to a vulcanizing temperature sufficient to blow said sponge rubber compound until expansion thereof forces said skin stock into all-over conformity with said cavity walls and causes said compound to fill the balance of said spaces wherefore to form said sectional portions of integrated vulcanized sponge rubber and solid rubber skin in end-to-end conjoined angularly diverging relation, removing said sectional portions from the mold, and folding and bonding said sectional portions into mutually overlapping joindure to constitute the ultimate body to be produced.

2. A method of minimizing skin stretch in the molding and vulcanizing of a sheet of sponge rubber compound simultaneously with a sheet of uncured vulcanizable solid rubber skin stock to form integrated component parts of an ultimate relatively long and narrow all-rubber article, which comprises the steps of, placing a sheet of sponge rubber compound in face to face contact with a sheet of vulcanizable solid rubber skin stock in spanning relation to the entrance mouth of an underlying mold cavity considerably wider than the ultimate article to be produced and whose side walls converge and meet at a channel bottom of said cavity less than half as broad as the width of said entrance mouth and having a contour proportioning said cavity to be substantially no deeper than said width of said entrance mouth, mechanically poking said cavity spanning sheets in unison toward said channel bottom in a manner to loop said sheets in unison into neighboring relation to said side walls of the mold cavity with the aid of a protruding mold core sufficiently smaller than said cavity to enable the sides of said core to cooperate with said side walls to define end-to-end communicating spaces branching apart from said channel bottom toward said mouth of the cavity, each of said spaces being equal in shape and size to sectional portions of the width of said ultimate article, imprisoning said sheets in said spaces, heating said sheets in said spaces to a vulcanizing temperature sufficient to blow said sponge rubber compound until expansion thereof forces said stock into all-over conformity with said cavity walls and causes said compound to fill the balance of said spaces wherefore to form said sectional portions of integrated vulcanized sponge rubber and solid rubber skin in end-to-end conjoined angularly diverging relation, removing said sectional portions from the mold and folding and bonding said sectional portions into mutually overlapping joindure to constitute the ultimate body to be produced.

3. A method of minimizing skin stretch in the molding and vulcanizing of a sheet of sponge rubber compound simultaneously with a sheet of uncured vulcanizable solid rubber skin stock to form integrated component parts of an ultimate relatively long and narrow all-rubber article, which comprises the steps of, placing a sheet of sponge rubber compound in face to face contact with a sheet of vulcanizable solid rubber skin stock in spanning relation to the entrance mouth of an underlying mold cavity considerably wider than the ultimate article to be produced and whose side walls converge and meet at a channel bottom of said cavity less than half as broad as said entrance mouth, mechanically poking said cavity spanning sheets in unison toward said channel bottom in a manner to loop said sheets in unison into neighboring relation to said side walls of the mold cavity with the aid of a protruding mold core sufficiently smaller than said cavity to enable the sides of said core to cooperate with side walls to define end-to-end communicating spaces branching apart from said channel bottom toward said mouth of the cavity, each of said spaces being equal in shape and size to sectional portions of the width of said ultimate article, imprisoning said sheets in said spaces, heating said sheets in said spaces to a vulcanizing temperature sufficient to blow said sponge rubber compound until expansion thereof forces said skin stock into all-over conformity with said cavity walls and causes said compound to fill the balance of said spaces, wherefore to form said sectional portions of integrated vulcanized sponge rubber and solid rubber skin in end-to-end conjoined angularly diverging relation, removing said sectional portions from the mold, and folding and bonding said sectional portions into mutually overlapping joindure to constitute the ultimate body to be produced.

4. The method defined in claim 1, in which the said spaces of the mold cavity that are divided by the said protruding mold core extend in outboard relation to the said cavity mouth wherefore to mold an elongation of at least one of the said sectional portions all of whose surface are devoid of the said solid rubber skin.

5. The method defined in claim 1, in which the said sides of the said mold core are of mutually conforming shape.

6. The method defined in claim 1, in which the said sides of the said mold core respectively bordering said spaces are flat.

7. The method defined in claim 1, in which one side of the said mold core bordering one of the said cavity spaces is convex and the other side of said mold core bordering the other cavity space is concave.

References Cited in the file of this patent

UNITED STATES PATENTS

| | | |
|---|---|---|
| 1,353,477 | Jamieson | Sept. 21, 1920 |
| 1,354,734 | Furguson | Oct. 5, 1920 |
| 1,708,059 | Griffiths | Apr. 9, 1929 |
| 1,958,131 | Davidson | May 8, 1934 |
| 2,171,728 | Lee et al. | Sept. 5, 1939 |
| 2,201,669 | Kraft | May 21, 1940 |
| 2,202,042 | Blount | May 28, 1940 |
| 2,204,622 | Reid | June 18, 1940 |
| 2,319,042 | De Wyk | May 11, 1943 |
| 2,458,864 | Lindsay | Jan. 11, 1949 |
| 2,492,566 | Geyer | Dec. 27, 1949 |
| 2,626,163 | Scantlebury | Jan. 20, 1953 |